(12) United States Patent
Ono et al.

(10) Patent No.: US 7,236,089 B2
(45) Date of Patent: Jun. 26, 2007

(54) VEHICLE-MOUNTED DISPLAY UNIT

(75) Inventors: Shunsuke Ono, Shizuoka (JP);
Masahiro Muramatsu, Shizuoka (JP);
Yoshiharu Matsuo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 204 days.

(21) Appl. No.: 11/044,276

(22) Filed: Jan. 28, 2005

(65) Prior Publication Data

US 2005/0168330 A1 Aug. 4, 2005

(30) Foreign Application Priority Data

| Jan. 28, 2004 | (JP) | ............................ 2004-020065 |
| Jan. 28, 2004 | (JP) | ............................ 2004-020066 |
| Jan. 11, 2005 | (JP) | ............................ 2005-003891 |
| Jan. 14, 2005 | (JP) | ............................ 2005-007748 |

(51) Int. Cl.
*B60Q 1/00* (2006.01)
*G09G 5/00* (2006.01)

(52) U.S. Cl. ...................... 340/461; 340/438; 340/439; 340/441; 340/449; 340/450; 340/451; 340/459; 340/460; 340/462; 345/4; 345/5; 345/6; 345/7; 345/8; 345/9

(58) Field of Classification Search ........ 340/438–439, 340/441, 449–451, 459–462; 345/4–9
See application file for complete search history.

(56) References Cited

U.S. PATENT DOCUMENTS

| 5,353,735 | A | | 10/1994 | Arai et al. | |
| 5,578,985 | A | * | 11/1996 | Cremers et al. | ............ 340/461 |
| 5,644,289 | A | * | 7/1997 | Frehner et al. | ............. 340/461 |
| 6,181,301 | B1 | * | 1/2001 | Inoguchi et al. | ............... 345/5 |
| 6,333,697 | B1 | * | 12/2001 | Kumazawa et al. | ..... 340/815.4 |
| 6,621,471 | B1 | * | 9/2003 | Ozaki et al. | .................... 345/4 |
| 7,073,125 | B1 | * | 7/2006 | Nystrom et al. | ............ 715/703 |
| 2002/0149495 | A1 | * | 10/2002 | Schach et al. | ......... 340/815.78 |

FOREIGN PATENT DOCUMENTS

| DE | 19530419 A1 | 8/1995 |
| DE | 19757564 A1 | 12/1997 |
| DE | 19950155 C1 | 10/1999 |

(Continued)

OTHER PUBLICATIONS

Office Action from the German Patent and Trademark Office received Aug. 22, 2006 for Official File No. 10 2005 003 920.0-51.

*Primary Examiner*—Benjamin C. Lee
*Assistant Examiner*—Lam Pham
(74) *Attorney, Agent, or Firm*—Finnegan, Henderson, Farabow, Garrett & Dunner, L.L.P.

(57) ABSTRACT

The vehicle-mounted display unit includes a display having a meter area and an auxiliary indication area. The meter area indicates a dial image for showing measured values of an operational condition of a motor vehicle. The auxiliary indication area indicates information other than the measured values. The display unit has a control device for controlling contents indicated on the display. The control device indicates a normal length pointer extended in the auxiliary indication area at a normal indication state, while the control device indicates a shorter length pointer in the auxiliary indication area when the other information is indicated.

6 Claims, 13 Drawing Sheets

FOREIGN PATENT DOCUMENTS

| | | |
|---|---|---|
| DE | 10134365 A1 | 7/2001 |
| DE | 10225385 A1 | 6/2002 |
| JP | 09023122 A | 1/1997 |
| JP | H9-23122 | 1/1997 |
| JP | 11-248490 | 9/1999 |
| JP | H11-271100 | 10/1999 |
| JP | 2001-191816 | 7/2001 |

* cited by examiner

VEHICLE-MOUNTED DISPLAY UNIT

BACKGROUND OF THE INVENTION

1. Field of the Invention

The present invention relates to a display unit mounted on a motor vehicle.

2. Related Art

A conventional display unit of such a type is disclosed in Japanese Patent Application Laid-open No. 2001-191816, which was proposed by the same applicant as the present application.

FIG. 14 is an explanatory view showing a general configuration of a screen of the conventional vehicle-mounted display unit. The display unit watches abnormal states of a battery, a radiator, and an engine which are disposed in a bonnet of a motor vehicle. The system has a warning indication area 103 that selectively turns on each of warning symbols 103a, 103b, 103c, and 103d for warning an abnormal state of a charge quantity of the battery, a cooling water of the engine, a lubricating oil pressure of the engine, or an electronic control process of the engine. The screen indicates not only a specified content of an abnormal state but also the position of an associated instrument. For example, it is shown that the abnormality has occurred in the bonnet by turning on a bonnet position mark 101b arranged on a vehicle profile 101a of a warning position recognition area 101. The screen has an area 105 for indicating instruction illustrations 105a, 105b, and 105c to repair the warned instrument if necessary.

Furthermore, Japanese Patent Application Laid-open No. H-9-23122 discloses another vehicle-mounted display unit. FIG. 15 is an explanatory view showing screen pages of the display unit.

The display unit has a display 210 for sequentially indicating instructive illustrations on a screen 211. Each illustration has an image and instruction keys, and an oral instruction is also provided as additional information.

For example, FIG. 15 shows steps for fitting a chain on a tire of a motor vehicle. The unit displays the steps sequentially on the screen 211 and gives oral instructions associated with an image instruction of each step. FIG. 15A shows an initial step on the screen 211 for setting the chain on the tire, and the unit gives a message to prepare the chain for the tire. FIG. 15B shows a next step for laying the chain on the tire, and the unit gives an oral instruction for putting the chain on the tire. FIG. 15C shows a further next step on the screen 211 for winding the chain on the tire, and the unit gives an oral instruction for the winding process.

Furthermore, each screen page indicates a previous page key 224'a, a pause key 224'b, a next page key 224'c, and a menu key 224'd all at once. For example in FIG. 15B, the previous page key 224'a can change the screen to show the previous page of FIG. 15A. The next page key 224'c functions to indicate the next screen page of FIG. 15C. The pause key 224'b functions to keep the same image, and a repeat key 224'e is indicated in place of the pause key 224'b until one of the other keys is operated. The repeat key 224'e is also associated with an oral instruction repeatedly given. The menu key 224'd functions to indicate an instruction menu including handling of a tire chain on the screen regardless of the sequence of the screen pages.

Further another conventional vehicle-mounted display unit is disclosed in Japanese Patent Application Laid-open No. H-11-271100. FIGS. 16A and 16B show the display unit. As shown in FIG. 16A, the display unit has two indication units 72, 73. Each indication unit 72 or 73 has a pointer 52 driven by a driving unit 51 for analog indication of measured values. The indication units 72, 73 are disposed on a single meter board 58. The meter board 58 has also an illumination portion 78. Each indication unit 72 or 73 has a predetermined scale 53 arranged on the meter board 58. Inside each scale 53, there is disposed a display 54 surrounded by the scale 53. Scale numerals 55 are indicated on the display 54. In the left indication unit 73, the scale numerals 55 show engine revolution rates, while in the right indication unit 72, the scale numerals 55 show running speeds of the vehicle. The scale numerals 55 can be changed in indication range and scale unit. The scale numerals 55 can be added with marks including a speed limit mark 79 and a revolution warning mark 80. Thereby, the indication unit can show a vehicle running speed with either of km/hour or mile/hour unit without mechanical modification and another printed marks. Furthermore, the display 54 has other indication areas, for example to show a fuel residual quantity or an expected running distance 71.

The scale numerals 55 and a top 56 of the pointer 52 are arranged so as to be opposed to the markings of the scale 53. Thereby, the analog meters of the indication units 72, 73 are convenient to recognize the revolution or the running speed.

The indication unit 73 has a driving unit 51, a pointer shaft 57, and a driving shaft 59 which are incorporated with each other to compose a component. Therefore, the display 54 is formed with a through hole for engaging the display 54 with the component via the driving shaft 59. The display 54 is a liquid crystal dot-matrix one. The pointer 52 is connected to the pointer shaft 57 through a pointer hub 63 and further to the driving shaft 59. Thus, the driving shaft 59 turns the pointer 52 around a central axis 62.

The analog meter of the indication unit 72 has a driving unit 51 spaced from a central axis 62. The indication unit 72 has a driving shaft 59 which drives a shaft 57 of a pointer 52 through a driving member 60 like a belt. The driving member 60 is covered by a plate 61 not to be visible from the front side. The cover plate 61 also covers the pointer 52 when the pointer 52 is not working. Likewise, the indication unit 73 has a cover plate 61. The driving units 51 of the indication units 72, 73 are positioned in the rear side of the meter board 58 as shown by dotted lines in FIG. 9A.

FIG. 16B shows another control state of the indication unit 73 of FIG. 16A. The pointer of the indication unit 73 is in its rest state to be positioned behind the cover plate 61. The display 54 is used for providing other operational information of the vehicle. The display 54 has an indication area 69 for specifically showing gear position of an automatic gear unit. The display 54 is no longer used for showing engine revolution unlike FIG. 16A, but the display 54 functions to show a warning indication 70 showing overheat of a catalyst in an exhaust gas system. For clearer warning, the warning indication 70 is, for example, of a fluorescence color which is distinguished from the color of the revolution meter shown in FIG. 16A. The speed meter of the indication unit 72 has an additional indication area 67 and another additional 68 showing a running distance of the vehicle.

However, the conventional display system of FIG. 14 is disadvantageous in design of a meter and an instrument panel for indicating a great amount of information which requires a large symbol displaying space. Furthermore, the predetermined indication pattern of FIG. 14 can not show the degree of warning.

The conventional display system of FIG. 15 shows the steps along operation of the keys. However, each screen page shows only a regular pattern, and several keys are necessary to obtain desired information, improvement of which has been needed.

In the conventional display system shown in FIGS. 16A and 16B, the left indication unit 73 in FIG. 16A does not show the engine revolution in the state shown in FIG. 16B. Furthermore, the right indication unit 72 shows the additional information in the indication area 67, and the information indication interferes with the pointer 52 in the state shown in FIG. 16B, degrading the information indication in clarity.

SUMMARY OF THE INVENTION

In view of the aforementioned situation, an object of the present invention is to provide a vehicle-mounted display unit enabling a comprehensive indication of measured values showing vehicle running speed and engine revolution simultaneously with other additional information of a motor vehicle.

To achieve the above-mentioned object, a vehicle-mounted display unit includes:

a display having a meter area and an auxiliary indication area, the meter area indicating a dial image for showing measured values of an operational condition of a motor vehicle, the auxiliary indication area indicating information other than the measured values and a control device for controlling contents indicated on the display, wherein the control device selectively provides a normal indication or a maintenance indication in the auxiliary indication area, the normal indication including the dial image and a normal length pointer for showing the measured values, the long pointer extended in the auxiliary indication area, the maintenance indication including an animation for maintenance information of the vehicle. This allows a comprehensive instruction indication for maintenance of the vehicle.

Preferably, the control device controls the display such that the maintenance indication includes a pointer shorter than the normal length one. Thereby, the display system allows a normal meter indication including engine revolution speed and vehicle running speed simultaneously with indication of information different from the normal meter indication. The changeover between the longer pointer and the shorter one provides a new design of a meter that is advantageous in visuality and compactness.

Preferably, a three-dimensional indication is applied to the animation. This provides a further new design of the meter having a comprehensive image for showing integrated information for operation of the motor vehicle.

A second aspect of the present invention is a vehicle-mounted display unit includes:

a display having a meter area and an auxiliary indication area, the meter area indicating a dial image for showing measured values of an operational condition of a motor vehicle, the auxiliary indication area indicating information other than the measured values and a control device for controlling contents indicated on the display, wherein the control device indicates a normal length pointer in the auxiliary indication area at a normal indication state, while the control device indicates a shorter length pointer in the auxiliary indication area when the other information is indicated.

Thereby, the display system allows a normal meter indication including engine revolution speed and vehicle running speed simultaneously with indication of information different from the normal meter indication. The changeover between the longer pointer and the shorter one provides a new design of the meter that is advantageous in visuality and compactness.

Preferably, the control device changes the length of the pointer such that a distal end of the pointer is constant in its radial distance from a pivot of the pointer. Thus, the pointer does not interfere with the indication of additional information in the auxiliary indication area, improving the information in clarity.

Preferably, the control device changes the length of the pointer such that the pointer is changed from a longer one to a shorter one via an intermediate length one. This provides a new design of the meter for a driver who can recognize the shortening step of the pointer.

Preferably, the control device indicates the pointer with a given-width afterimage positioned in a training side of the pointer when the pointer moves. This provides a new design of the meter for a driver who can recognize the movement of the pointer.

DETAILED DESCRIPTION OF PREFERRED EMBODIMENT

Referring to the accompanied drawings, embodiments of a vehicle-mounted display unit according to the present invention will be discussed hereinafter.

Figure 1:
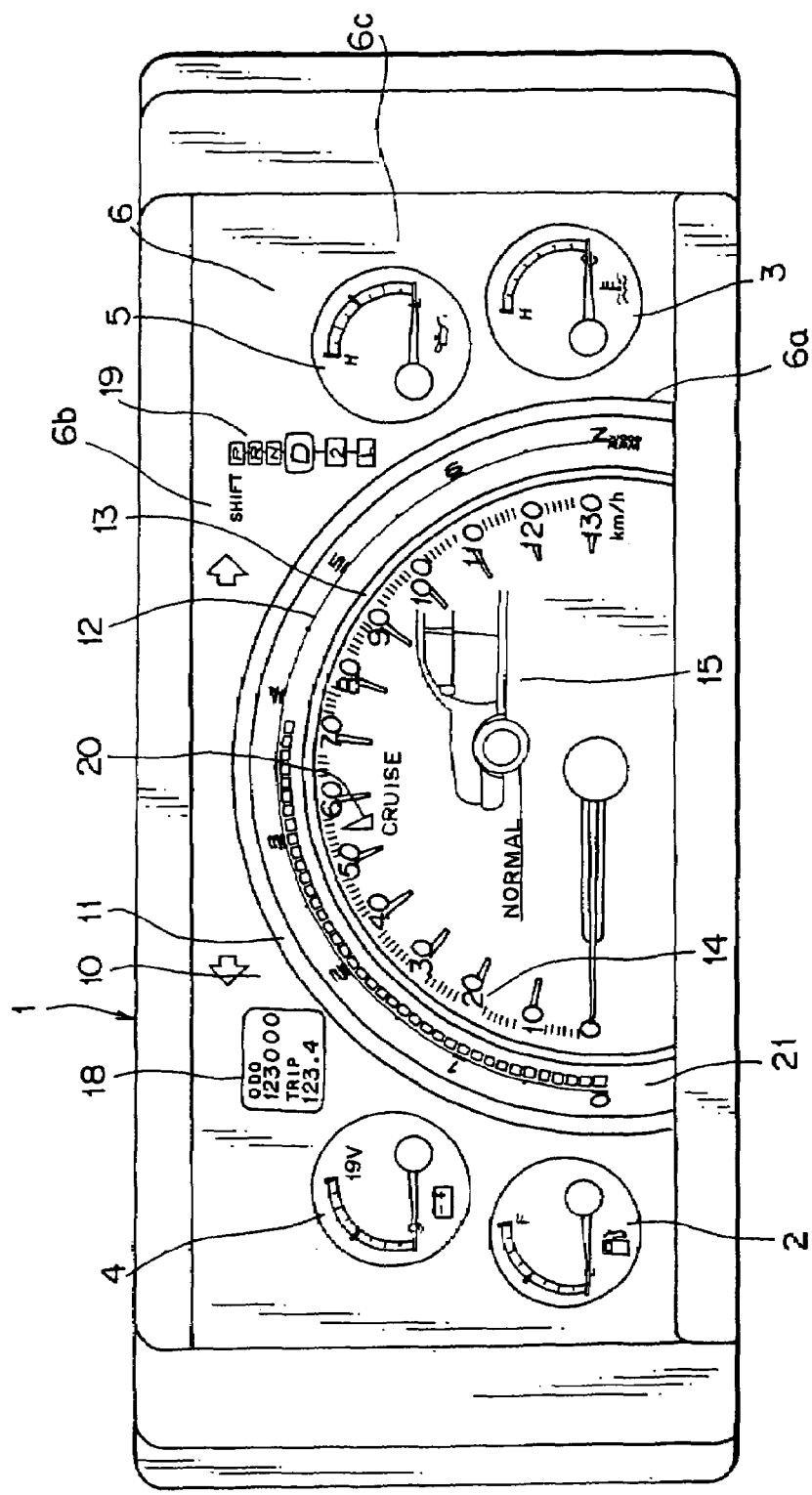
FIG. 1 is a front view showing an embodiment of a vehicle-mounted display unit according to the present invention.

In FIG. 1, a vehicle-mounted display unit 1 has a meter display 10 disposed at a front central area thereof. Around the meter display 10, there are arranged a plurality of independent analog indicators, which are a fuel meter 2 indicating a residual amount of a liquid fuel such as gasoline, a meter 3 indicating a temperature of a cooling water, a battery voltage meter 4 indicating voltage thereof, and a pressure meter 5 showing pressure of engine oil.

The meter display 10 is constituted by a liquid-crystal display (LCD), an electro-luminescence device, a cathoderay tube, or the like. In this embodiment, an LCD is applied. The meter display 10 indicates various information of operational conditions of the motor vehicle on its screen.

The screen has a semi-circular dial for showing measured values of operational states of the vehicle. The dial has a profile line 11, a tachometer zone 12 indicating engine speed, a division line 13, and a speed meter zone 14 indicating vehicle running speed. Inside the speed meter zone 14, there is provided an auxiliary indication area 15 showing another information such as warning signals. Between the speed meter zone 14 and the auxiliary indication area 15, a pointer 20 is arranged together with a pattern image corresponding to the semi-circular dial to compose an analog meter.

In a left side of the semi-circular dial, there is disposed an odometer (trip meter) 18. In a right side of the semi-circular dial, there is disposed an automatic shift lever indication area 19.

Figure 2:
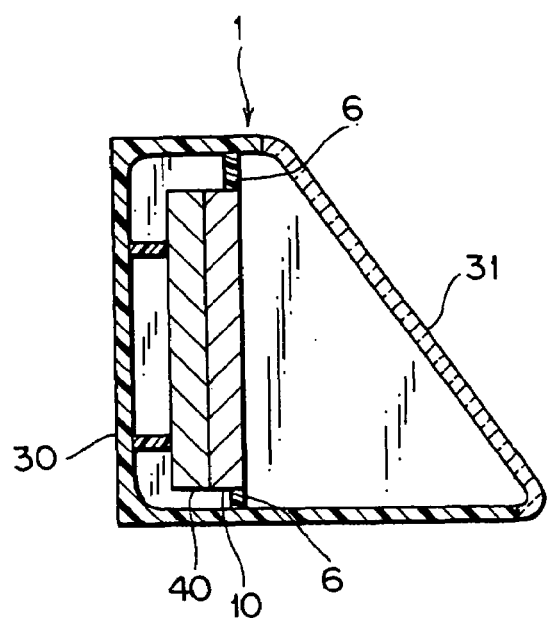
FIG. 2 is a sectional view showing a construction of the display unit.

As shown in FIG. 2, the display unit 1 has a meter case 30 and a front glass 31 attached to the meter case 30, which define an inner space accommodating the meter display 10 and the analog indicators. On a rear surface of the meter display 10, there is disposed a control board 40. Between the meter display 10 and the analog meters, there is provided a face plate 6 as shown in FIG. 1. The face plate 6 is formed with a recess 6a along an outer periphery of the profile line 11 such that the inside of the profile line 11 is visible. The odometer (trip meter) indication area 18 and the automatic shift lever indication area 19 each are a transparent portion 6b. An area surrounding the analog meters, which are the fuel meter 2, the water temperature meter 3, the battery voltage meter 4, and the oil pressure meter 5, is coated in a black color.

Figure 3:
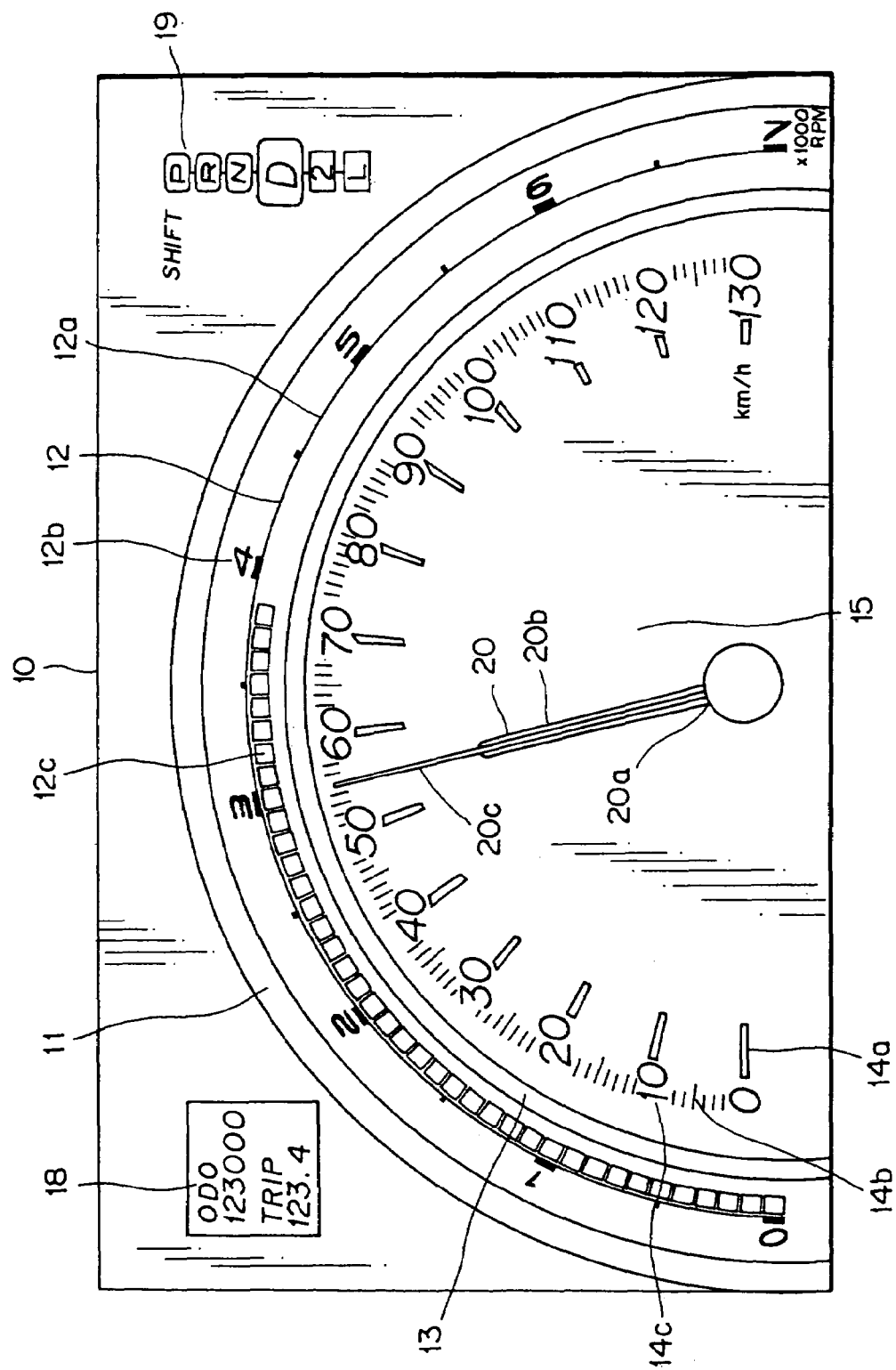
FIGS. 3 to 6 show examples of screen pages of the display unit.

Next, as shown in FIG. 3, the meter display 10 indicates a longer pointer 20 in the auxiliary indication area 15 at a normal indication without additional information such as warning signals. The pointer 20 has a pivot 20a at its lower end, an intermediate portion 20b extended from the pivot 20a, and a narrow top portion 20c extended from the intermediate portion 20b.

The speed meter zone 14 has a radially extended bold-faced scale 14a of the semi-circular dial, a radially extended scale 14b positioned outside the bold-faced scale 14a, and scale numerals 14c corresponding to the scale 14a. The scales 14a, 14b, and 14c are always indicated. In the embodiment, the scales of the speed meter show km per hour. Thus, the scales and the pointer 20 constitute an analog-type speed meter.

That is, the pointer 20 is turnable around the pivot 20a, and the top portion 20c of the pointer 20 points a running speed of the vehicle. For example, FIG. 3 indicates a running speed of about 55 km per hour.

The tachometer zone 12 has a scale line 12a and scale numerals 12b corresponding to the scale line 12a, which are always indicated. The scale line 12a includes a semi-circular profile line and scale numerals provided along the profile line at regular intervals in a circumferential direction of the scale. Between the scale line 12a and the division line 13, there is arranged a plurality of segments 12c for showing an engine revolution rate. Each segment 12c is square, and the number of the segments 12c corresponds to the engine revolution rate. For example, the tachometer indicates that the engine revolution rate is about 3,800 per minute in FIG. 3.

Figure 4:
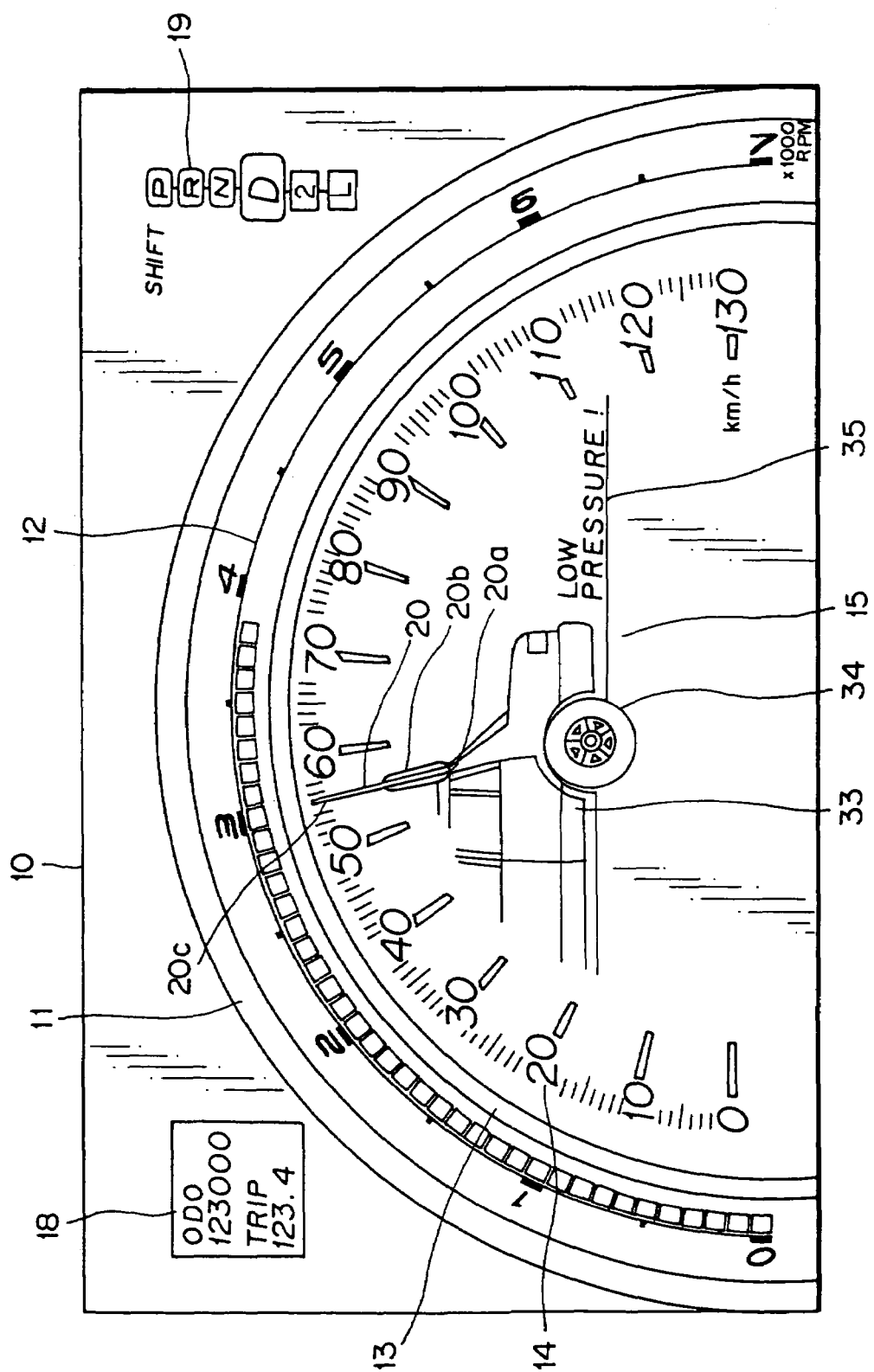

Next, as shown in FIG. 4, the meter display 10 indicates additional information in the auxiliary indication area 15. The additional information shows vehicle operational states other than the engine revolution and vehicle running speed, and in FIG. 4, a warning indication is presented for a driver of the vehicle. In FIG. 4, a warning message 35 is indicated to show that a rear wheel 34 of the vehicle 33 has an undesirable lower air pressure. A three-dimensional image of the vehicle with the tire is also presented in the auxiliary indication area 15.

Furthermore, as shown in FIG. 4, the image of the pointer 20 is changed into a shorter one, when the auxiliary indication area 15 presents additional information such as a warning indication. That is, the shorter image of the pointer has a length extended from the pivot 20a to the top end top portion 20c, which is less than a normal length of the pointer shown in FIG. 3. The shorter image of the pointer 20 allows a clear information indication in the auxiliary indication area 15.

Figure 5:
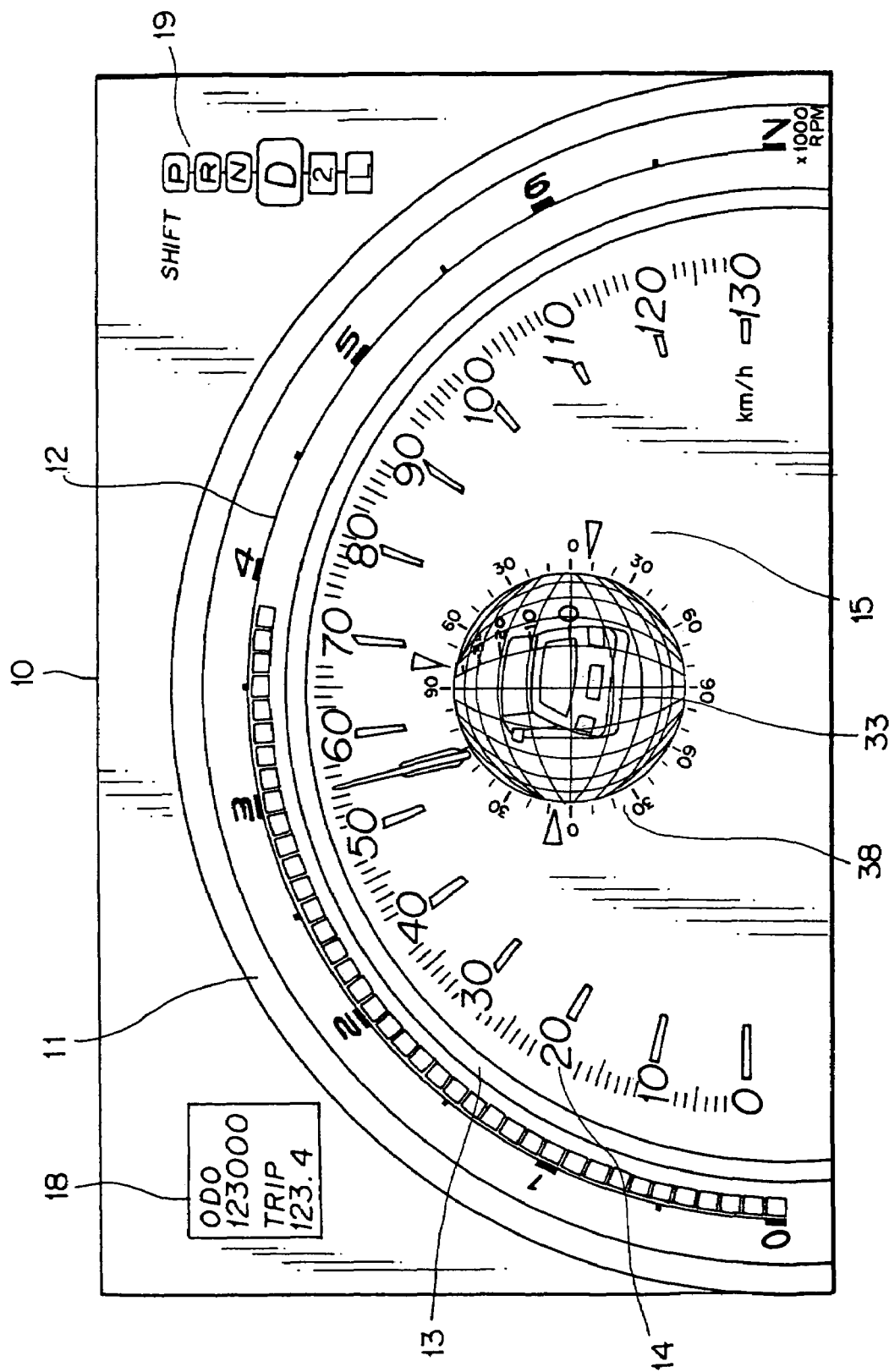

As shown in FIG. 5, the meter display 10 can be switched to present an inclination indication 38 in the auxiliary indication area 15. The inclination indication 38 shows an inclination degree of the vehicle 33 in real time with a three-dimensional image.

Figure 6:
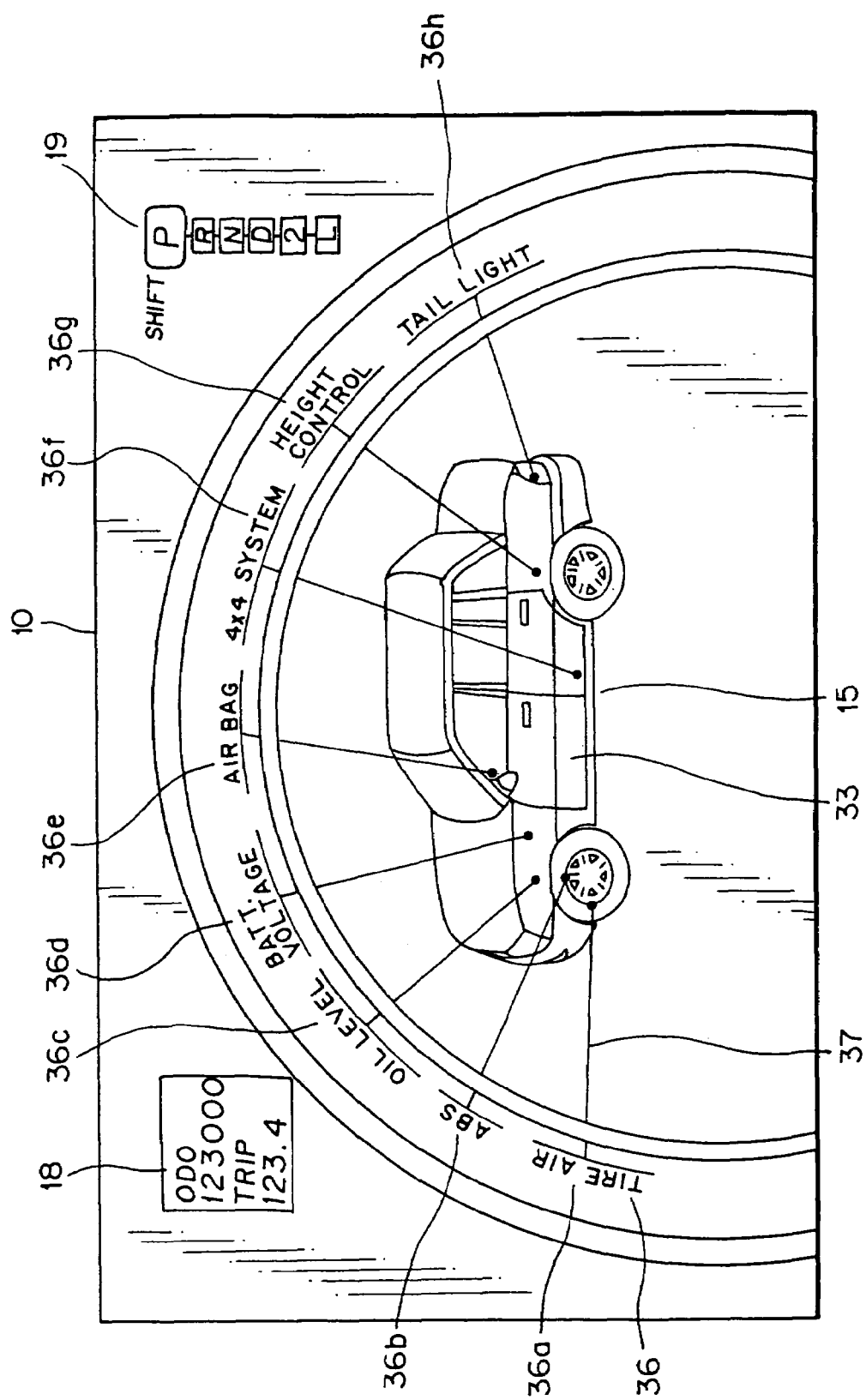

As shown in FIG. 6, the meter display 10 can be switched to present a diagnostic indication 36 as additional information in a total area including the tachometer zone 12, speed meter zone 14, and auxiliary indication area 15. For example, the diagnostic indication 36 is related to a tire air pressure (TIRE AIR) 36a, an anti-lock braking system (ABS) 36b, an engine oil level (OIL LEVEL) 36c, a battery voltage (BATT. VOLTAGE) 36d, an air bag (AIR BAG) 36e, a four-tire driven system (4×4 SYSTEM) 36f, vehicle height control (HEIGHT CONTROL) 36g, tail lamps (TAIL LIGHT) 36h, or the like. For each diagnostic item, a diagnostic result can be indicated in the meter display 10. In FIG. 6, each diagnostic item is connected to an associated part of the vehicle 33 by an index 37, in which the vehicle 33 is presented in a three-dimensional image.

Figure 7:
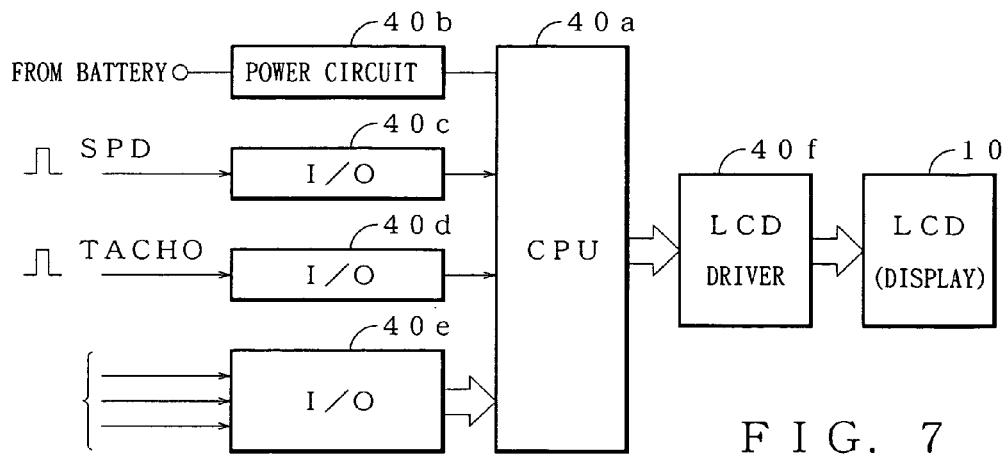
FIG. 7 is a block diagram showing an electrical configuration of the display unit.

FIG. 7 is a block diagram primarily showing an electrical configuration of a control device mounted on the control board 40 for controlling indication of the meter display 10 of the display unit 1. The control unit has a micro computer (CPU) 40a as a control unit, a power circuit 40b connected to a battery (not shown) to supply power to the computer 40a, an input/output circuit 40c connected to a speed sensor (not shown) to transmit running speed signals of the vehicle, an input/output circuit 40d connected to a revolution sensor (not shown) for supplying engine revolution signals (TACHO), an input/output circuit 40e connected to other sensors, an LCD driver 40f receiving indication signals of information processed by the computer 40a, and an LCD (display). The display is of a TFT-type one controlled by the LCD driver 40f and constitutes the meter display 10.

Figure 8:
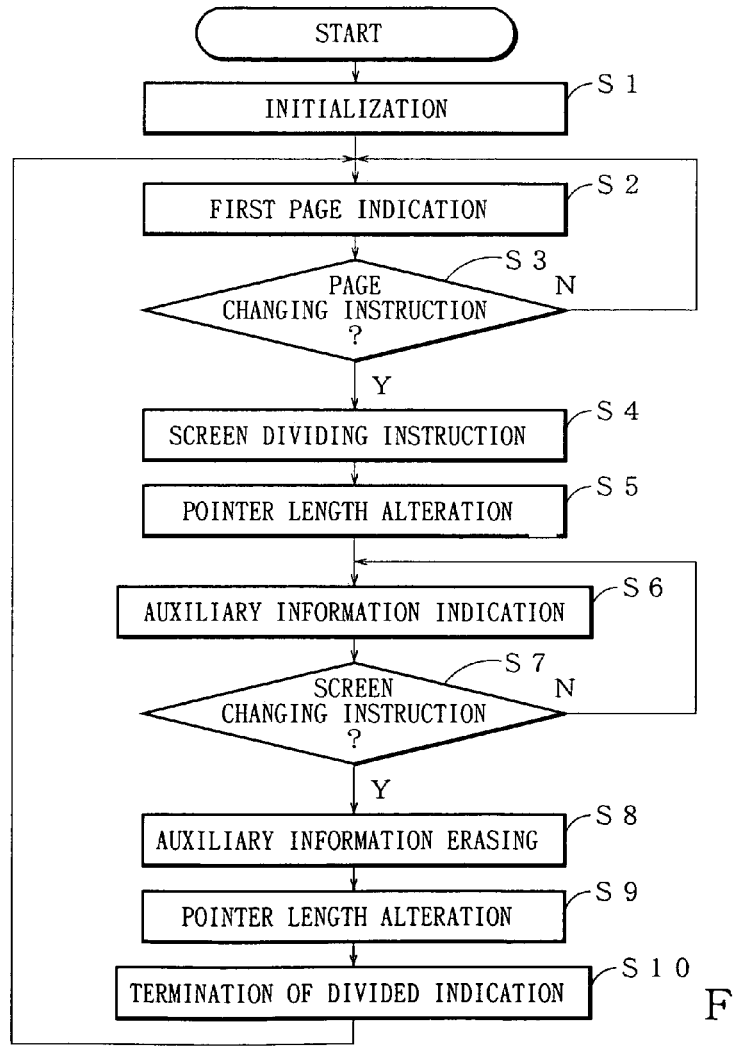
FIG. 8 is a flowchart showing operational steps of the display unit.

Next, referring to the flow chart shown in FIG. 8, processing steps of the computer 40a of thus configured control unit will be discussed. Step S1 initializes appropriately the control device with turning-on of the display unit 1. A next step S2 indicates an initial screen page in the meter display 10. The initial screen page is, for example, the image shown in FIG. 1. Based on signals from the sensors, an engine revolution rate is indicated by the number of the segments 12c, and a vehicle running speed is indicated by the pointer 20.

A next step S3 determines presence or absence of a screen page changing instruction based on signals supplied from the sensors. The execution returns to step S2 when the instruction is absent. Meanwhile, a next step 4 divides the screen page when the screen page changing instruction is present. The dividing process separates the indication area for the pointer 20 from the auxiliary indication area 15 within the meter display 10.

Figure 9A:
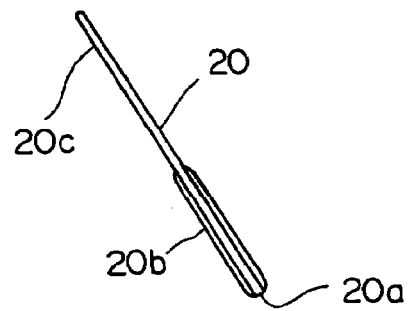
FIGS. 9A, 9B, and 9C each show an image of a pointer variable in length.
Figure 9B:
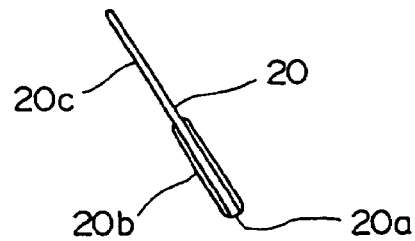
Figure 9C:
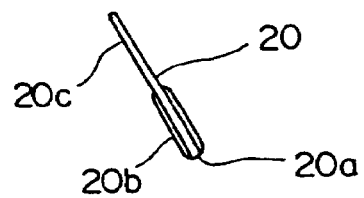

A next step S5 changes the pointer 20 to become shorter in length. For example, as shown in FIGS. 9A, 9B, and 9C, the pointer 20 is controlled to be changed stepwise from a longer one to a shorter one via an intermediate length one. In this process, the pointer length is changed such that the pivot end 20*a* of the pointer shifts toward the top of the pointer while the pointer top keeps its original radial position. A driver can see the shortening process of the pointer. The intermediate length pointer of FIG. 9B may be indicated temporally with the longer one of FIG. 9A or the shorter one of FIG. 9C to clearly show the length changing process.

A next step S6 indicates additional information such as a warning signal. Then, step S7 determines presence or absence of a screen page changing instruction. The execution returns to step S6 when the instruction is absent. Meanwhile, a next step 8 erases the additional information image in the auxiliary indication area 15 when the screen page changing instruction is present.

A next step S9 changes the pointer 20 to become the longer one from the shorter one. A next step S10 ends the divided indication of the screen page.

Figure 11:
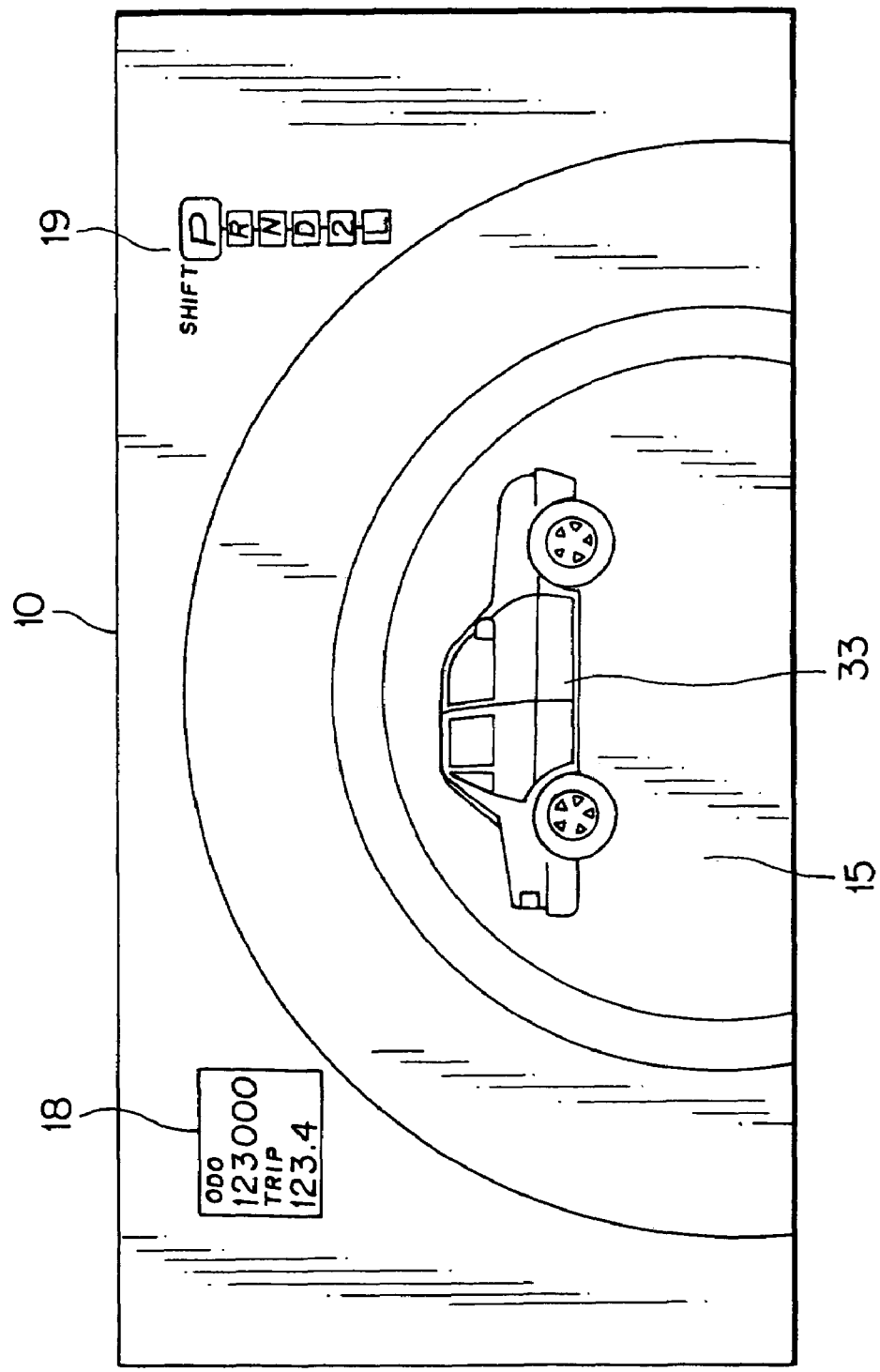
FIGS. 11 and 12 each show another indication example of the display unit.
Figure 12:
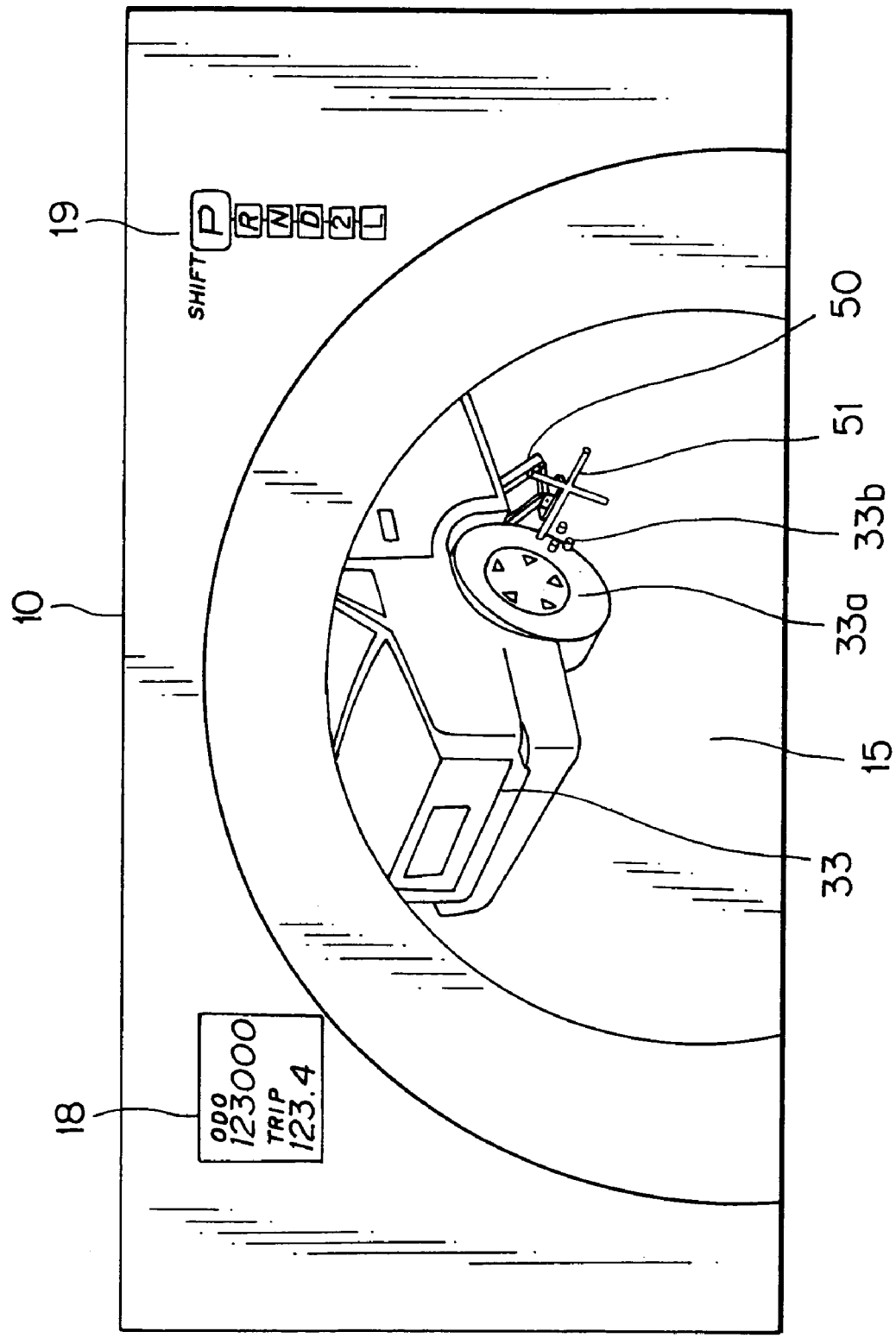

As shown in FIGS. 11 and 12, the meter display 10 can indicate a maintenance instruction as additional information in the auxiliary indication area 15. The maintenance instruction may be a three-dimensional image. As an example of the maintenance instruction, a tire replacement process will be discussed hereinafter.

Figure 13:
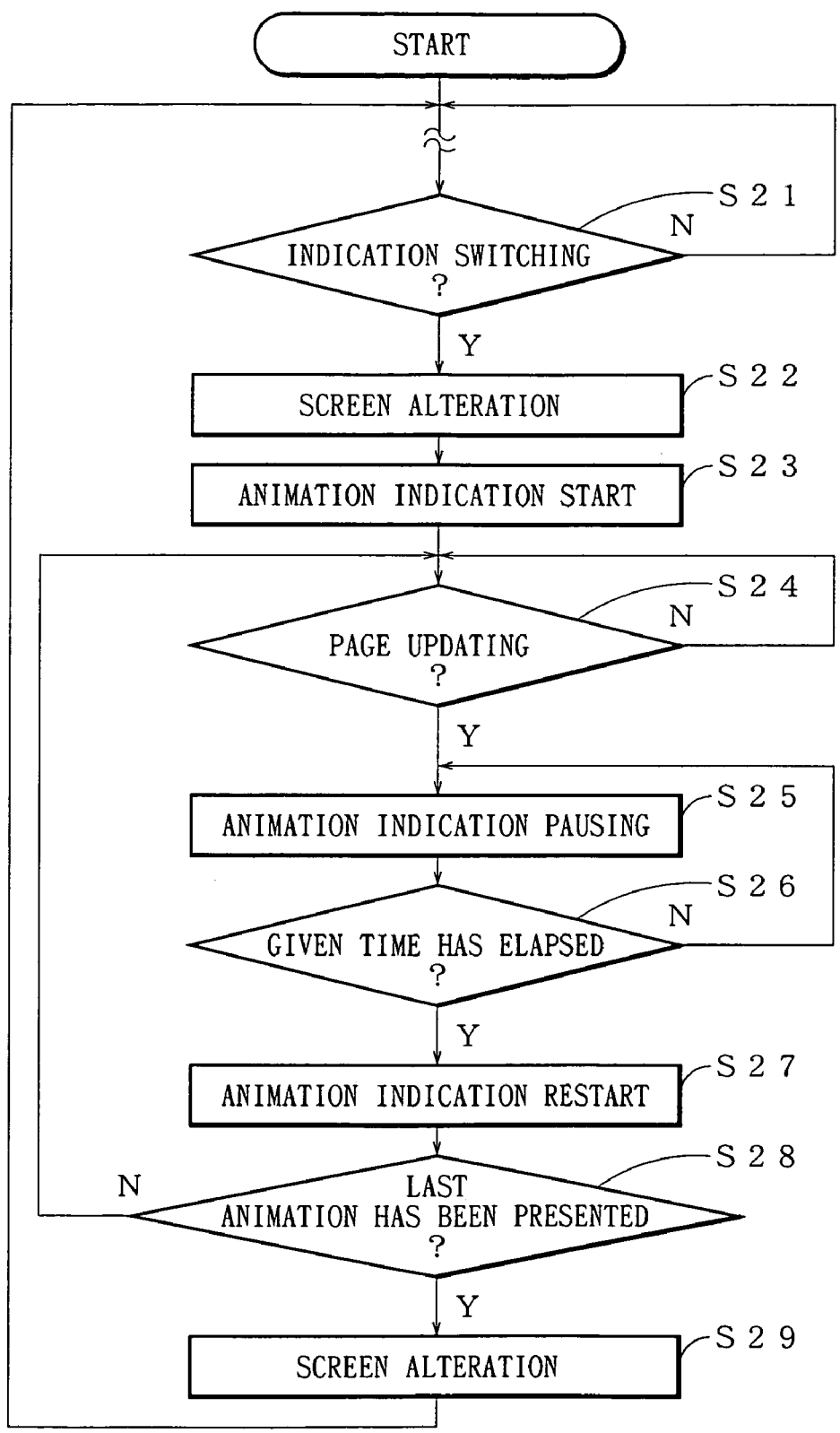
FIG. 13 is a flowchart showing other operational steps of the display unit.
Figure 14:
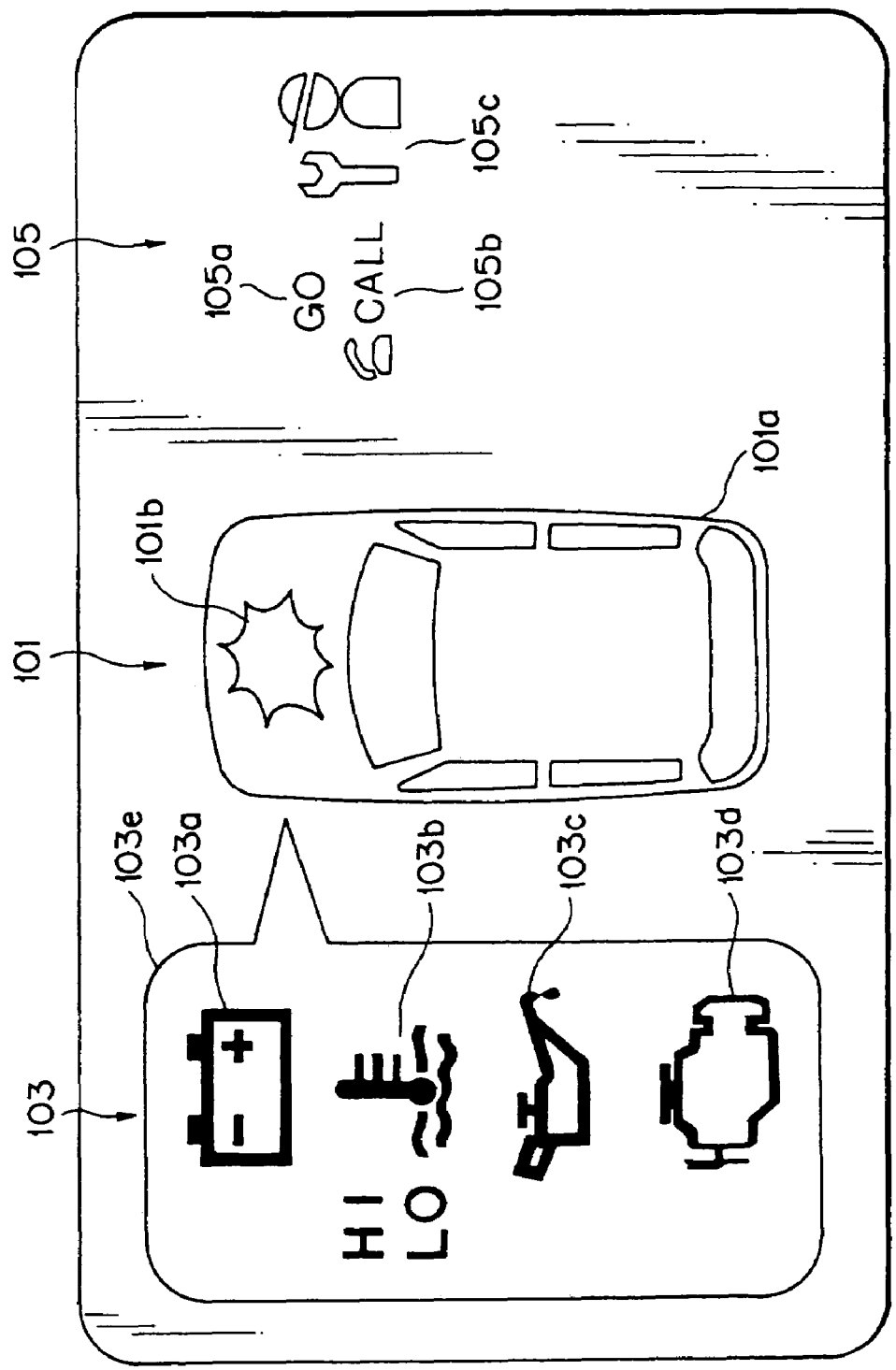
FIG. 14 is an explanatory view showing a general configuration of a screen of a conventional vehicle-mounted display unit.
Figure 15C:
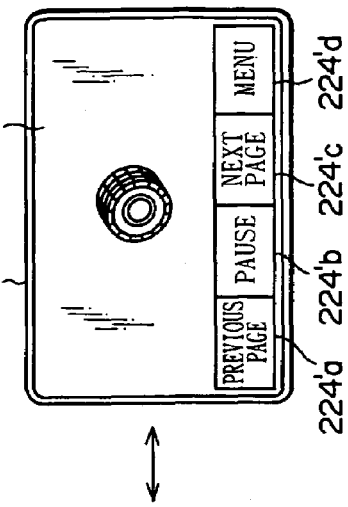
FIGS. 15A to 15E are explanatory views showing screens of another conventional vehicle-mounted display unit.
Figure 15E:
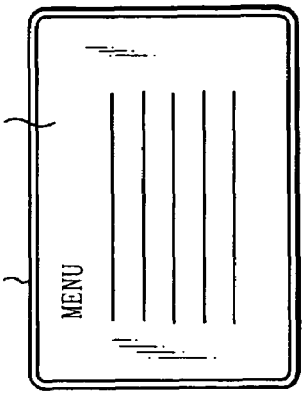
Figure 15B:
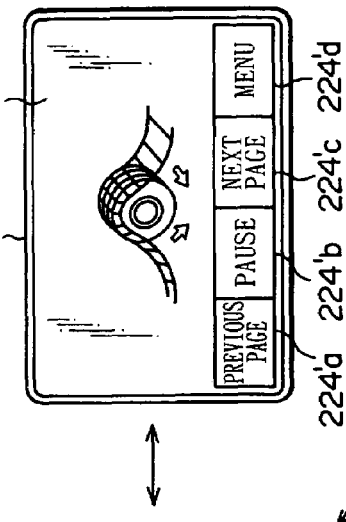
Figure 15D:
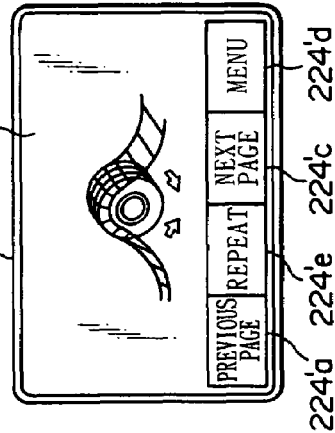
Figure 15A:
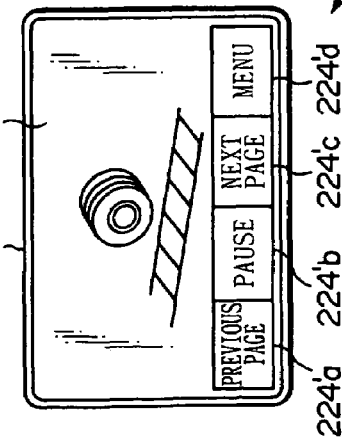
Figure 16A:
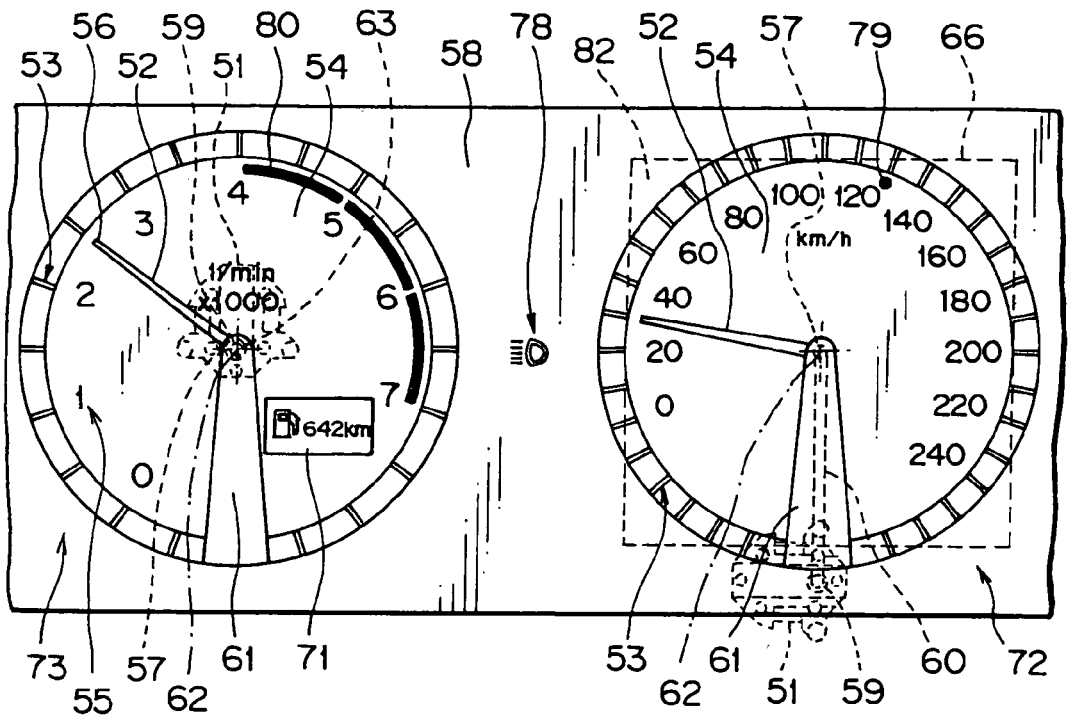
FIGS. 16A and 16B are explanatory views showing further another conventional vehicle-mounted display unit.
Figure 16B:
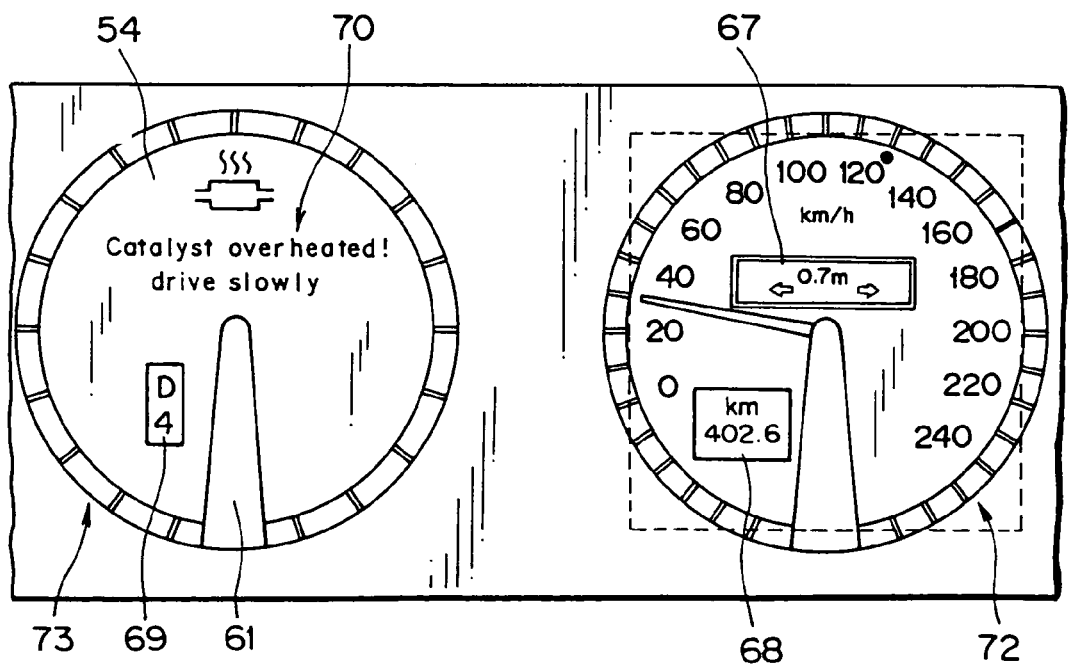

Referring to the flowchart of FIG. 13, processing of the computer 40*a* of the control unit for the maintenance instruction will be discussed. First, step S21 determines presence or absence of an indication changing instruction. A next step S22 changes a screen page to become a maintenance instruction when the instruction is present.

That is, as shown in FIG. 11, after a whole normal image is deleted in the tachometer zone 12, speed meter zone 14, and auxiliary indication area 15, a maintenance instruction is presented in an additional indication area 17. For example, the maintenance instruction begins with a message of "TROUBLE SHOOTING". Furthermore, a whole body image of the vehicle 33 is presented as an initial screen page in the auxiliary indication area 15.

A next step S23 starts to present animations to show a plurality of sequential maintenance steps. CPU 40*a* preliminarily stores a plurality of animations. Step S23 provides a first scene, and a page updating key is given when there is a next page.

A next step S24 determines to show a next scene when the updating signal is given. A next step S25 pauses the first scene.

A next step S26 determines whether a given time has lapsed from the pause of the first scene. After the given time, step S27 restarts animation indication to present a second animation.

A next step 28 determines whether further another animation is present or not. If not, the execution returns to step S24.

When the last animation is presented, a next step S21 changes the indication to show the initial screen page positioned before step S21.

Further referring to the aforementioned operation, for example, a tire replacement animation is provided as a maintenance indication. FIG. 11 shows a first screen page, and then a rear wheel of the vehicle 33 is indicated in a zoomed image with a red color. Furthermore, a message of "TIRE BURST" in a red color is given near the tire image. A next screen page turns the vehicle 33, and a spare tire and a jack, which are stored in a rear part of the vehicle, are indicated with flashing indication in a red color. A next screen page indicates animation for jacking up the vehicle 33.

A next animation shows how to remove the tire as shown in FIG. 12. FIG. 12 indicates that the vehicle 33 is lifted by a jack 50 and bolts 33*b* of a rear wheel 33*a* are removed with a wrench 52.

A next screen page indicates a removal step of the tire 33*a*. A further next step indicates to set a spare tire. A last screen page indicates how to lower the vehicle body.

Thus, tire replacement steps are presented with animation indication. Therefore, even a beginner can complete the tire replacement.

To restart the animation indication, an operation switch can input a corresponding signal. The animation indication may pause to keep indication of a screen page during a period.

As discussed above, the display unit according to the present invention gives a maintenance instruction for a driver to do a maintenance work such as replacement of a tire.

The present invention is not limited in the embodiments discussed above but modifications and developments of the embodiments are also possible within the spirit of the present invention.

For example, the dial of the speed meter may have a scale unit of mile/h, which is different from a km unit applied in the discussed embodiments. The dial may be changed in design in consideration of application, destination port, and specification of the display unit. The different designs may be preparatorily stored in the memory of CPU 40*a* as bit-map images which are selectively supplied.

In the discussed embodiment, the pointer length is controlled to change from the longer one to the shorter one via the intermediate one. Alternatively, the pointer length may be controlled to change from the longer one (FIG. 10A) directly to the shorter one (FIG. 10C).

In the discussed embodiment, the speed meter is defined by the images of the pointer 20 and the semi-circular dial while the tachometer is defined by the images of the second semi-circular dial and the segments 12. Alternatively, the speed meter and the tachometer may change design with each other.

Figure 10:
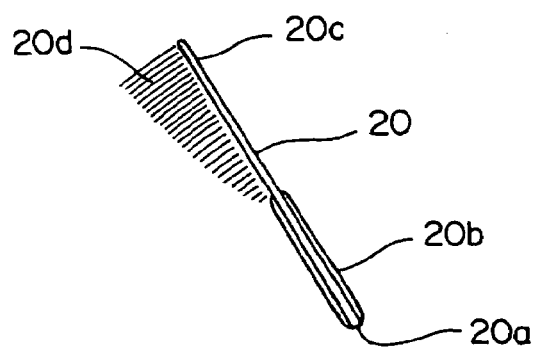
FIG. 10 shows an image of the pointer with an afterimage thereof.

Furthermore, as shown in FIG. 10, the pointer may be controlled to have an afterimage 20*d* extended in its trailing side when the pointer turns to show an increased vehicle speed. This provides a further new design of the meter to show comprehensively the movement of the pointer.

Moreover, the auxiliary indication area 15 can provide images for height control of the vehicle, compass, warning for incomplete closure of a door, fuel residual quantity, air-conditioning state, etc. These images may be presented in three-dimensional graphic designs.

What is claimed is:

1. A vehicle-mounted display unit, comprising:
a display having a meter area and an auxiliary indication area, the meter area indicating a dial image for showing measured values of an operational condition of a motor vehicle, and the auxiliary indication area indicating information other than the measured values; and
a control device for controlling contents indicated on the display,
wherein the control device selectively provides a normal indication or a maintenance indication in the auxiliary indication area, the normal indication including the dial image and a normal length pointer which extends into the auxiliary indication area, and the maintenance indication including an animation for maintenance of the vehicle, and wherein the control device controls the display such that the maintenance indication includes a pointer shorter than the normal length pointer.

2. The display unit recited in claim 1, wherein a three-dimensional indication is applied to the animation.

3. A vehicle-mounted display unit, comprising:

a display having a meter area and an auxiliary indication area, the meter area indicating a dial image for showing measured values of an operational condition of a motor vehicle, and the auxiliary indication area indicating information other than the measured values; and a control device for controlling contents indicated on the display, wherein the control device displays a normal length pointer in the auxiliary indication area in a normal indication state and a shorter length pointer in the auxiliary indication area when the information other than the measured values is indicated.

4. The display unit recited in claim 3, wherein the control device changes the length of the pointer such that a distal end of the pointer is constant in a radial distance from a pivot of the pointer.

5. The display unit recited in claim 4, wherein the control device changes the length of the pointer from a longer length to a shorter length via an intermediate length.

6. The display unit recited in claim 3, wherein the control device displays the pointer with an afterimage positioned in a trailing side of the pointer when the pointer moves.

* * * * *